| United States Patent [19] | [11] Patent Number: 4,542,035 |
| Huang et al. | [45] Date of Patent: Sep. 17, 1985 |

[54] STABLE AERATED FROZEN DESSERT WITH MULTIVALENT CATION ELECTROLYTE

[75] Inventors: Victor T. Huang, Brooklyn Center; Cynthia A. Colson, Minneapolis; Sam Yong, Minneapolis; John F. Clemmings, Minneapolis, all of Minn.

[73] Assignee: The Pillsbury Company, Minneapolis, Minn.

[21] Appl. No.: 590,255

[22] Filed: Mar. 16, 1984

[51] Int. Cl.[4] ............................................. A23G 9/00
[52] U.S. Cl. .................................... 426/565; 426/566; 426/567
[58] Field of Search ................. 426/565, 566, 567, 72

[56] References Cited

U.S. PATENT DOCUMENTS

| 1,424,603 | 8/1922 | Turney | 426/565 |
| 2,433,276 | 12/1947 | Hipple et al. | 426/565 |
| 3,914,440 | 10/1975 | Witzig | 426/565 |
| 4,421,778 | 12/1983 | Kahn | 426/565 |

OTHER PUBLICATIONS

Arbuckle, W. S., Calcium Sulfate in Ice Cream, Ice Cream Field, Sep. 1952, pp. 132–133.

Primary Examiner—Jeanette Hunter
Attorney, Agent, or Firm—Robert J. Lewis; Michael D. Ellwein

[57] ABSTRACT

Aerated foam food products of the frozen dessert type are provided with improved stability and smoothness, thereby allowing them to be stored and distributed at 0° F. (−18° C.) without loss of quality. Improved stability is achieved by using a protein bridging edible multivalent cation containing electrolyte.

22 Claims, No Drawings

STABLE AERATED FROZEN DESSERT WITH MULTIVALENT CATION ELECTROLYTE

BACKGROUND OF THE INVENTION

Frozen aerated food products, to which this invention is directed include frozen desserts such as ice cream, ice milk, mellorine, sherbet, frozen custard, frozen pudding and the like, frozen shake beverages such as milk shakes, mousse, yogurt and frozen shake concentrate. The popularity of these products is attributable to their convenience, widespread availability, nutritive value and appealing forms, colors and flavors. In part, due to the familiarity of such frozen products to the consumer, to be acceptable they must not only have suitable flavor and appearance, but also possess a complex set of physical properties which provide the characteristics which consumers have come to expect. In addition, the nature and composition of the most popular aerated frozen products are set by various standards promulgated by the U.S. Food and Drug Administration as well as the individual states. Such rigid consumer acceptance criteria, regulatory standards and the complex nature of the interactions which produce a satisfactory product make it extremely difficult to reformulate such aerated frozen products in an attempt to provide improvements. Solutions to one set of problems quite often generate other problems which make the product unacceptable.

Foam stability of conventional aerated frozen desserts is a major problem. Ice cream and related aerated frozen desserts are stored, distributed, delivered and sold at deep freeze temperatures, i.e. $-20°$ F. ($-29°$ C.), to give some measure of stability to these products and protect their special textural properties. Economically, $0°$ F. ($-18°$ C.) distribution systems are more feasible and available. At $0°$ F. ($-18°$ F.) distribution system, one major problem is that temperature fluctuations invariably occur which can result in the thawing and refreezing of the product, seriously deteriorating its quality over time. In home freezers and conventional freezing dispensing chambers temperature fluctuation can also be very severe. The "heat shock" to the frozen products from these fluctuations is characterized by the formation of large ice crystals and big air cells, and results in a coarse, gloss appearance and gritty mouthfeel. Heat shock frequently also produces a separation of the syrupy aqueous phase from the air and fat matrix which ultimately make the appearance and texture of the product unacceptable.

Another problem with foam products is that at deep freeze and household freezer temperatures the product is so hard that it is difficult to scoop and serve immediately from the freezer. Hardness at these levels are easier to achieve and help stabilize the products which is good for producers but a detriment to consumers.

Several solutions to these problems have been attempted in the past. For example, increased stability has been imparted to aerated frozen desserts through the use of various stabilizers and stabilizer combinations. The drawback of this approach is that stabilizers frequently are required in such great quantities that the feel of the product in the mouth is altered, producing a cloying, gummy or greasy sensation. Another approach has been to increase the amount of added sugars relative to the fat and/or water in the product, but the large amount of sugar required to provide acceptable stability often results in too sweet a taste or unacceptable crystal formation. Still another approach has been to increase the amount of incorporated air, i.e., "overrun", and thereby decrease the amount of freezable water per unit volume. This attempt at reformulation, however, not only results in a texture which is more characteristic of a whipped topping than of a frozen dessert like ice cream, but is limited by the applicable standards of identity relating to required weight per volume and solids content.

As a result of the instability of most aerated frozen desserts, producers have been required to manufacture the products locally to avoid the long periods of storage and temperature variations which are associated with national distribution from a few centrally located plants. Since most producers, distributors and retailers rely on deep freeze temperatures for preserving the quality of ice cream-type frozen desserts during storage, distribution and sale, totally separate systems are required for such products than are used for other frozen foods, which can be distributed at temperatures ranging from $0°$ F. ($-18°$ C.) to $10°$ F. ($-12°$ C.). A very extensive network of frozen food storage, distribution and retailing facilities has been established nationwide, and therefore it can be seen that it would be extremely advantageous from an economic and efficiency standpoint if an ice cream-type and other types of aerated frozen dessert of acceptable quality and stability could also utilize this system.

Milkshakes and similar frozen shake beverages are representative of another type of aerated frozen food product in which poor stability has limited the storage and distribution systems which the manufacturer can utilize. As is well-known, milkshakes are usually manually prepared or dispensed from a commercial establishment for consumption on the premises. Various attempts have been made in the past to provide products which are more widely available or are more susceptible to automated procedures. For example, milkshakes have simply been packaged in individual cups and frozen solid for distribution. The product is then warmed under controlled conditions to room temperature, agitated or otherwise mixed, and served. Another approach has been to prepare and distribute a frozen milkshake concentrate which serves as a base to which milk or water is added with agitation. Still another approach has been to aseptically can or bottle a prepared milkshake which is consumed after being chilled, shaken and opened. All of these prior approaches have either required unacceptably large amounts of time or space, required a reconstitution step which is either difficult or time-consuming and/or have provided milkshakes which do not have the desired creaminess, coldness and consistency of commercially prepared milkshakes.

Since shakes are extremely popular items at fast food restaurants, it is of course important to reduce the time and labor involved in preparing large quantities of shakes manually. The present invention provides shakes with improved stability which can be prepared in individual containers in central locations and shipped in a frozen state to various restaurant locations where they are stored and served at refrigeration temperatures without any on-site preparation.

Accordingly, it is an object of this invention to provide aerated frozen food products which are stable for sufficient periods of time to allow national distribution under conditions and temperatures encountered in $0°$ F. ($-18°$ C.) frozen food systems. Another object is to provide an aerated frozen product which attains the aforesaid stability without a basic reformulation which would bring the product outside the limits of consumer acceptance and regulatory standards. A still further object of the invention is to provide aerated frozen dessert products having the above attributes which are also soft and scoopable at freezer temperatures. Another object is to provide shakes and similar beverages having the above attributes which retain the desirable characteristics of commercially prepared milkshakes when served at refrigeration temperatures (e.g. 15° F. (−9.5° C.) to 25° F. (−4° C.)). A related object is to provide a frozen shake concentrate which can readily be reconstituted by the consumer into a high-quality shake.

SUMMARY OF THE INVENTION

The invention is directed to a stable and smooth aerated frozen foam type dessert having the properties of high quality ice cream at 0° F. (−18° C.) and being a shakelike consistency at higher dispensing temperatures. In general, the aerated frozen foam of the invention comprises 50–75% water in the form of ice crystals and an aqueous phase, 2–30% edible triglyceride fat; 4–15% milk derived solid, and an overrun of about 50% to about 250%, food grade multivalent cation containing electrolyte wherein the cation is present in amounts in the range of between about 0.5% and about 50% by weight of protein and natural or chemical emulsifier of 0.05% to 0.50%. Unless otherwise indicated all percents are percent by total weight of product (mix or frozen).

In accordance with the present invention, the fat component of the aerated frozen food product comprises an edible preferably semi-plastic oil at room temperature, either dairy or non dairy, which preferably has a solid fat index (SFI) of at least about 30 at 50° F. (10° C.). The mix containing this fat is homogenized to form an emulsion of fat globules in water. The emulsion can be subsequently aged to crystallize the fat globules prior to whipping. The vast majority of the fat in a non-dairy product, i.e. at least 94%, is preferably in the form of fat dispersed in the aqueous phase with only a small amount, i.e. less than 6%, in the form of free or de-emulsified fat. The overrun of the aerated frozen food product is preferably from about 50% to about 250%.

The stable aerated frozen food products of the invention are extremely versatile and can be given a variety of textures and consistencies by varying the formulation. A preferred embodiment of the invention comprises a stable dessert product having 52% to 70% water in the form of ice crystals and an aqueous phase, 3% to 15% of the aforementioned edible oil, 4% to 15% non-fat milk solids, and minor but effective amounts of stabilizer and emulsifier. Preferably, the whipping step is sufficient to provide an overrun in the range of about 50% to about 250% in order to produce frozen desserts having the textural characteristics and appearance of conventional desserts. Products having the characteristics of soft-serve ice cream at 0° F. (−18° C.) may further comprise a freezing point depressant, preferably in the form of added sugars or other soluble solutes.

Ready-to-serve shake beverages having improved stability are also provided in accordance with this invention by controlling the amount of water in the above-mentioned formulation and controlling the overrun to achieve the desired shake consistency. Preferred shakes of the invention comprise about 63% to 68% water, 3% to 9% of the aforementioned edible oil, and about 50% to 80% overrun. These shake products can be distributed through conventional frozen food systems in solid frozen form and then stored for several days at refrigeration temperatures (15° F. (−9° C.) to 25° F. (−4° C.)) before consumption without losing the desirable characteristics of commercially prepared milkshakes. The invention can also be employed to provide a frozen concentrate to which water or other liquids are added at room temperature with stirring to produce shake beverages.

DETAILED DESCRIPTION OF THE INVENTION

It has quite unexpectedly been found that freeze-thaw stable, aerated frozen desserts of superior stability and smoothness could be produced using this invention. In accordance with this invention, a specific multivalent cation containing electrolyte of slow water solubilizing ability is selected for blending with other frozen dessert ingredients, and the resultant mix is subjected to homogenization, aging and aeration/freezing process. Without intending to be bound by theory, it is thought that the multivalent cation interacts with the protein component and thus strengthens the lamella among the air cells. Thus the air cells will be small and uniform initially. After freeze thaw stresses, it can still maintain products with smoother texture and smaller air cells than otherwise could be provided.

Preparation in accordance with this invention results in aerated frozen food products which have sufficient stability to retain their desirable organoleptic properties for at least 50 days, and preferably as long as 180 days, at conditions which are normally encountered in typical 0° F. (−18° C.) frozen food storage, distribution and retailing systems. As a result, the products may be manufactured in a relatively few plants and distributed nationally and/or internationally using the same facilities as other frozen food items such as frozen vegetables, frozen entrees and frozen pizza. Frozen dessert products of the invention do not require a separate deep freezer in the retail store, and can be sold and/or consumed directly from the frozen food case or home freezer. The shake beverages of the invention can be delivered to the restaurant site frozen solid in individual containers and then stored and dispensed directly from a dispenser having a chamber in which the product has equilibrated to a temperature from 15° F. (−9° C.) to 25° F. (−4° C.). Alternately, shakes can easily be prepared at home from a frozen concentrate of the invention stored in the home freezer. Preferably, 2 or 3 parts of frozen concentrate are diluted with one part of water, or some other suitable liquid such as milk or juice, and then the diluted concentrate is stirred with a spoon to form the shake.

As briefly described above, the oils suitable for use in the practice of this invention have a Solid Fat Index (SFI) at 50° F. (10° C.) of at least about 30. SFI values are readily determined in accordance with standard analytical procedures using a dilatometer. Suitable oils are derived from coconut, soybean, cottonseed, corn, palm kernel, peanut, dairy fats or the like. Since ice cream, ice milk, and milkshake standards require the use of butter fat, it is contemplated that dairy fat meeting the SFI requirements of the invention could also be used to produce stable ice cream, ice milk, and milkshake products in accordance with this invention.

The amount of the fat component will vary depending on the aerated frozen food product being prepared and the particular organoleptic properties desired. Generally, the amount of the fat component comprises about 2% to 30% by weight of the mix and aerated product.

The fat component of this invention can be mixed with other ingredients at ambient temperatures and if the oil is not pre-emulsified it is preferably injected at an elevated temperature above its melting point into the aqueous mix containing the other ingredients. The resultant mixture is then homogenized, primarily to reduce the size of the fat globules and form a stable oil-in-water emulsion. In accordance with the preferred embodiment of the invention, the mix is homogenized at a low pressure, i.e., a total pressure below 6000 psig, to provide a uniform distribution of small fat globules in the emulsion.

In accordance with the present invention, the mix is homogenized to provide oil droplets in the range of 0.2 to 1.5 microns, preferably 0.2 to 0.5 microns.

Homogenizers commonly used in ice cream manufacture may be employed to homogenize the mix. Although homogenizing techniques not utilizing pressure may be used, a homogenization pressure not in excess of a total of 6000 psig is preferred. In fact, one advantage of the present invention is that the desired homogenization can be achieved at pressures lower than that usually employed in conventional ice cream manufacture, e.g. pressures below 3000 psig. Homogenization is preferably accomplished at temperatures of 150° F. (66° C.) to 190° F. (88° C.).

The vigorous agitation of the mix during freezing and whipping inevitably results in some destabilization of the fat emulsion in the form of fat "churnout" or "de-emulsification", i.e., a coalescense wherein the fat globule loses its identity as a dispersed entity and forms pools, and/or "clumps" together to form larger particles. In a high melting fat containing system (e.g. non-dairy) it is preferred that the de-emulsified fat be less than about 6% and in low melting fat containing systems (e.g. dairy) less than about 15%. In addition, the emulsion prior to whipping may inherently contain some of this "free" fat. The current understanding in the ice cream art is that such physical properties as dryness and stiffness are related to the degree of de-emulsification of the fat. It is believed that too little de-emulsification results in a wetter-appearing and less stiff ice cream, whereas too much de-emulsification may result in a coarser texture. In addition, a coating of de-emulsified fat around the air cells tends to improve the foam stability of the product and is considered desirable. However, too much de-emulsified fat in the continuous phase may give a fatty or too creamy sensation to the frozen product.

De-emulsified fat can be extracted by hydrophobic organic solvents such as chloroform because of its "free" character, whereas emulsified fat cannot. Therefore, the level of de-emulsified fat in the frozen product can readily be determined by mixing a sample with chloroform, removing the chloroform soluble fraction, evaporating the chloroform and weighing the residue. De-emulsified fat so determined is then expressed as a percentage of the total fat.

The fat component of the invention may be used with monoglyceride and diglyceride emulsifiers and other emulsifiers normally used in aerated frozen food products and/or permitted by the applicable standards of identity. Such emulsifiers are typically used in amounts ranging from about 0.05% to about 0.5%, preferably less than about 0.4%. The emulsifiers may be conveniently melted with the fat component and metered together into the mix prior to homogenization.

It has been found that with increasing concentrations of organic di or tricarboxylic acids and/or their salts (acidity) in the products as described herein that the stability of the system would decrease. The stability of such a system is normally determined by the particular flavor. For example, vanilla and chocolate flavored systems are slightly acidic while strawberry is relatively acidic. It was discovered that by adding to the mix, preferably prior to homogenization, a multivalent cation containing electrolyte that the above described products could be stabilized with a more pronounced effect being achieved in higher acid systems and less effect being achieved in lower acid systems. Further, it was discovered that by controlling the viscosity of the mix after aging as described hereinbelow that the products very easily could be manipulated to form a series of frozen food products ranging from a milk shake consistency to pudding consistency in a very simple manner. Such products are generally characterized as shake-like, mousse and puddings with increasing final product viscosities after freezing. This could be achieved quite surprisingly without the addition of gums and other materials which normally give negative product qualities, most of which are directed to texture and were generally referred to as slimy or snotty in character which obviously are objectionable to consumers.

Although not wishing to be bound by any theory it is believed that the following is an explanation for what occurs by the addition of the multivalent cation containing electrolyte. Products as described herein take on a physical form which is an oil in water emulsion containing air bubbles from an aeration process. Aeration is usually accomplished during processing prior to or during freezing and after aging. Aeration and freezing are preferably done in an extruder. A Crepaco freezer with an 80% dasher has been found to be effective for aerating. The filler on the extruder is preferably an Anderson 456-P-B adjusted to not completely fill cups when a shake is being made. The emulsified and aerated product takes on the form of a foam which needs to be stabilized in order to give good product characteristics such as texture and a resistance to foam breaking during storage and/or consumption. The fat droplets are surrounded by a network of protein preventing the fat droplets from coalescing and forming larger fat droplets and a subsequent loss of product quality and phase separation. A typical emulsifier which is well known in the art could be Polysorbate 80 and/or Polysorbate 65 and/or monoglyceride and/or diglyceride and/or ethoxylated mono and diglycerides. It is also believed that the air bubbles in the foam are also surrounded by a protein network and in typical systems are held in place, i.e. stabilized by the hydrophobic components of the system, for example, proteins, fats, etc.

It has been found that by adding to the foam food product containing protein an edible multivalent cationic electrolyte material at prescribed levels and under conditions to control the rate of interaction and hence the degree of interaction (which can be measured by the viscosity increase of the mix containing the cations and a similar mix without the cations after aging) that an improved stability product particularly at higher acid levels can be achieved. The positively charged ionic component is believed to interact between the protein surrounding the fat droplets, the emulsifier and the protein surrounding the air to provide a gel-like network through polymerization of the proteins to provide enhanced stability unachieved in typical systems using emulsifiers alone and also provides a synergistic effect of helping bind the air in the system which helps prevent the foam from breaking during a period of temperature elevation as is typical during consumption of the food product.

The multivalent cationic material or the conditions under which it is added are controlled in order to control the rate of interaction with the proteins. This can be accomplished by either selecting a material which has an appropriate rate of solubilization in the system and/or the temperature of the system since solubility is determined by the material and the temperature of the system and the time in the system. The material can also be encapsulated to control the rate of solubility and hence the rate of interaction.

The degree of interaction between the cationic material and certain components of the system can be measured by the increase in viscosity of the mix during the aging step. It is preferred that the viscosity at 41° F. (5° C.) of the mix without the cations be in the range of between about 90 centipoise (cp) and about 600 cp, preferably in the range of between about 300 cp and about 600 cp and most preferably in the range of between about 400 cp and about 600 cp. The viscosity at 41° F. (5° C.) of the mix after aging and having the cations is in the range of between about 400 cp and about 2,000 cp, preferably in the range of between about 400 cp and about 1,000 cp and more preferably in the range of between about 500 cp and about 800 cp. It is preferred the aged mix containing cations have an increase in viscosity over the same mix but without the multivalent cations being present (i.e. all components of the two mixes are the same except for the presence of the multivalent cations). This increase in viscosity is above 10%, preferably more than about 20% and most preferably more than about 40%. The increase in viscosity shows the functionality degree of the cations.

The frozen product should have a viscosity of at least about 10,000 cp and preferably a viscosity of less than about 350,000 cp at 22° F. (5.5° C.). For shake-like consistency frozen products, the viscosity of the frozen aerated product should be in the range of between about 30,000 cp and about 50,000 cp at 22° F. (5.5° C.), for mousse-like frozen aerated products it should be in the range of between about 10,000 cp and about 350,000 cp at 22° F. (5.5° C.), and for pudding-like frozen aerated products it should be in the range of between about 20,000 cp and about 350,000 cp at 22° F. (5.5° C.).

Viscosity is measured with a Brookfield Viscometer Model RVT as follows:
  Mix—small sample adapter, no. 13 cups, spindle no. 21 at 20 rpm for 10 sec. duration.
  Frozen product—standard method using spindle no. 6 at 2.5 rpm for 1 minute duration.

The cationic material should be edible and can include compounds of group IIa, IIIb and transition metals and preferably are compounds of calcium, magnesium, aluminum, iron, manganese, etc. and should be multivalent cationic in the mix and preferably divalent cationic. The particularly preferred material is $CaSO_4 \cdot 2H_2O$. It is preferred that the level of the multivalent cations be present in the range of between about 0.5% and about 50%, preferably in the range of between about 1% and about 20% and more preferably in the range of between about 1% and about 5% by weight of protein in the mix and frozen product.

Protein should be in the mix and aerated product above about 1% and preferably in the range of between about 1% and about 10%, more preferably in the range of between about 2% and about 5% and most preferably in the range of between about 2% and about 4% on a dry weight basis by weight of mix or aerated product.

It is preferred that the cationic electrolyte have an effective solubility product at certain values. This can be achieved by selecting certain compounds or by controlling the solubility of compounds that would normally be too soluble, e.g. by encapsulation, controlling the particle size of the cationic electrolyte as is known. The effective solubility product ($K_{esp}$) can be measured by measuring the cation concentration (C) using an ion selective electrode. $K_{esp} = (C) \times (YC)^y$ where Y is the ratio of the molarity of the anion and cation in the electrolyte.

The effective solubility product should be above $10^{-5}$ and preferably in the range of between about $10^{-5}$ and about $10^{-1}$ and more preferably in the range of between about $10^{-4}$ and about $10^{-2}$. These values are for a mix at a temperature in the range of between about 30° F. ($-1$° C.) and about 45° F. (7° C.) aged for a time period of up to about 48 hours.

When the desired viscosity and viscosity increase are obtained, the mix is ready for further processing as is known in the industry. The mix is then aerated as described herein to achieve the desired degree of overrun and is cooled to a temperature of less than 32° F. (0° C.) and preferably below 0° F. ($-18$° C.) to freeze at least a portion of the water to provide a frozen dessert. Frozen as used herein means the temperature of the product is equal to or less than 32° F. (0° C.) and does not require that all water in the product be frozen. By the addition of the cationic material the stability of these products is greatly enhanced particularly at higher acid levels.

The mix may be pasteurized after homogenization in accordance with known commercial procedures. For example, continuous high temperature/short time (HTST) pasteurization is the most common method used by the larger ice cream plants and is suitable for the practice of the present invention. Minimum pasteurization standards for ice cream mix recommended by the U.S. Public Health Service are 175° F. (79° C.) for 25 seconds for the HTST method, and 155° F. (68° C.) for 30 minutes for the alternative holding method.

Following homogenization and pasteurization, the mix is rapidly cooled and held ("aged") at 30° F. ($-1$° C.) to 45° F. (7° C.) for a time sufficient to cause extensive crystallization of the fat globules, for up to about 48 hours and usually from about 2 to about 12 hours. It is believed that the resultant distribution of small fat crystals which retain a significant amount of solid fat at room temperature not only aids in the freeze-thaw stability of the product by providing physical barriers limiting the mobility of the aqueous phase, but also contributes to improved physical properties of the frozen product, such as a smoother texture.

After sufficient aging, the mix is simultaneously aerated ("whipped") and frozen in the conventional manner. During aeration the air bubbles have diameter in the range of between about 20–60 microns and preferably at least about 90% of the air bubbles are in this size range. In a continuous freezer, the mix is rapidly cooled to freezing temperature and air is simultaneously incorporated to form the basic foam structure of small uniformly dispersed air cells. These processes take place under conditions of vigorous agitation provided by a "mutator" or dasher, a rotating cylindrical device equipped with scraper blades and a whipping mechanism. The residence time during freezing is usually on the order of 30 to 120 seconds. As freezing proceeds, the mass becomes increasingly viscous and is finally extruded into containers from the freezer in a stiff plastic condition. Upon exit from the freezer/extruder it is preferred that the frozen product be at a temperature of less than 21° F. (−6° C.) and preferably in the range of 13° F. (−10.5° C.) to 21° F. (−6° C.). If the temperature is too low the product can shrink during storage and if too warm the product tends to have large air cells, large ice crystals and lower stability. The product may then be further frozen (hardened) at a temperature of about −20° F. (−29° C.) to −80° F. (−62° C.) prior to storage at typical frozen conditions.

The amount of incorporated air, i.e., the "overrun", is important to the overall stability of aerated frozen products, yet must be controlled within certain limits to provide an acceptable texture and appearance. Generally, the higher the overrun, the lower the amount of water per unit of volume, and therefore the more resistant the product is to the formation of the large ice crystals after heat shock. Although high overrun aerated frozen products exhibit increased stability, increasing the overrun to improve the stability will not always produce an acceptable product since there are limits placed on the amount of air incorporated in the product, both by the various standards of identity and consumer preference. For example, federal regulations on solids content and weight/volume relationships for ice cream and related products, such as mellorine and ice milk, effectively limit the overrun to about 110%. Frozen ice cream like desserts having overruns in excess of this amount tend to exhibit textural properties which are not characteristic of ice cream, and therefore are not preferred by consumers. The practice of the present invention is particularly advantageous for stabilizing ice cream-type frozen desserts without requiring overruns over 110%. Although products of this invention generally comprise less water than conventional ice cream-type products, they have similar overrun so as to retain the familiar textural properties of ice cream. Preferably, the frozen mellorine desserts and shake concentrates described herein comprise from 45% to 68% water, with 52% to 57% water being the most preferred range. Overrun for these products is usually from 50% to 110%, preferably about 60% to 90%.

There are no existing standards which dictate the amount of overrun in milkshakes and similar frozen shake products. However, such products usually become too foamy to be acceptable at overruns of 85% or over, and too liquid or thin at overruns of 30% or below. For the ready-to-serve frozen shakes of this invention, the preferred water content is 63% to 68% and the preferred overrun is about 50% to 80%.

A stable foam (aerated) phase imparts a structural rigidity to the subject frozen food products and aids in limiting the mobility of the aqueous phase which causes the separation of the phases during prolonged storage. To this end, foam stabilizers are useful in the practice of the present invention. Among the most useful stabilizers are the hydrophilic colloids, or hydrocolloids, commonly referred to as "gums". These long-chain high-molecular-weight polymers disperse in the aqueous phase and/or interact with other product ingredients to provide a thickening or gelling effect which stabilizes the foam structure. They also contribute to the stability of the product by serving as water-binding ingredients which limit the mobility of the aqueous phase. Common gums suitable for use in the present invention include natural gums such as carrageenan, guar gum, locust bean gum, xanthan gum, gelatin, alginates, pectin, dextran, glucan and the like, as well as modified natural gums such as carboxymethyl cellulose, methylcellulose ether and other modified cellulose derivatives, modified starch, polyacrylic acid, and the like, and various mixtures thereof. The permitted quantities of gums may be governed by federal and/or state regulations, as well as by consumer preference regarding such physical properties as mouth feel and melt-down rate. The unique stability characteristics of the products of this invention allow very small amounts of stabilizers to be used, preferably quantities much less than 1% and most preferably less than 0.3%.

Ice cream like aerated frozen dessert products of the invention may be given hardness and texture at 0° F. (−18° C.) which simulate that of commercially available soft-serve ice cream. Conventional soft-serve ice cream products are usually prepared using machinery located on the premises where they are consumed and are served at temperatures slightly below freezing, e.g., 15°-25° F. (−9° C. to −4° C.). Accordingly, these products characteristically have poor keeping qualities which prevent their effective distribution and storage off the premises. If exposed to the deep freeze temperatures necessary to prolong their shelf life, conventional soft-serve products become very hard and cannot be scooped from a container for serving. To solve this problem, aerated frozen dessert products sometimes include greater than normal quantities of sugars, alcohols and other low molecular weight compounds to lower the freezing point of the aqueous phase to an extract where the product is soft and scoopable and has a soft-serve texture at freezer temperatures. Frozen shake concentrates are also made more easily dispersible by the addition of such compounds. It has been found that the use of such freezing point depressants is compatible with the practice of the present invention and that the unique stability of the products can readily be achieved with formulations including such compounds.

The most useful freezing point depressants in the practice of this invention are sugars which not only have a sweetening effect, but also enhance the creamy texture of the product. The choice of sugars employed is controlled by the degree of freezing point depression desired and also by flavor and texture effects resulting from the addition of such sugars. An insufficient amount of sugar will produce an off-taste in the product, whereas too much sugar will produce excessive sweetness and may mask other desirable flavors. Different sugars also lower the freezing point of the product to varying degrees, depending on their molecular weights.

Preferably, the amount of added sugars in the products of this invention is 9% to 33% by weight. It has been found that the most desirable balance of sweetness and textural properties may be achieved by employing sucrose in combination with one or more sugars which are less sweet; for example, sucrose may be combined with dextrose, lactose, low-conversion corn syrup, etc; in order to obtain the benefits of a relatively large proportion of sugar at a level of sweetness which is less than that resulting from the use of an equal amount of sucrose alone.

The products of this invention comprise 4% to 15% non-fat milk solids. Although non-fat milk solids are the preferred source of protein, it is contemplated that other suitable frozen dessert proteins, such as casein, caseinates, whey protein concentrate, egg protein, and soy, peanut and/or vegetable proteins may be used. Non-fat milk solids are the solids of skim milk and can be added in dry form or as condensed skim milk. These solids include proteins, minerals and milk sugar. Milk sugar adds to the sweet taste of the frozen product and proteins aid in the development of the desired overrun as well as contribute to the desirable texture and body of the product. The use of larger amounts of non-fat milk solids increases the effect that whipping has on the frozen product and increases the viscosity and resistance to melting of the composition. They also tend to lower the freezing point of the product. Non-fat milk solids which contain not less than 2.5 mg/g undenatured whey protein nitrogen per gram of milk solids, as determined by the procedure set forth in American Dry Milk Institute Bulletin 916, are preferred.

The following examples are intended to illustrate the present invention, and are not to be construed as limiting the invention in any way:

EXAMPLE I

Frozen strawberry flavored aerated desserts having a pH of about 6.2 were prepared containing the following ingredients in parts by weight:

|  | Parts/Weight | |
|---|---|---|
|  | A | B |
| Non-Fat Dry Milk Solids | 8.57 | 8.57 |
| Whey Protein Concentrate | 0.48 | 0.48 |
| Fat Component | 5.72 | 5.72 |
| Dextrose | 9.53 | 9.53 |
| Sucrose | 2.38 | 2.38 |
| Corn Syrup | 5.72 | 5.72 |
| Xanthan Gum | 0.17 | 0.17 |
| Carrageenan | 0.049 | 0.049 |
| Emulsifier | 0.24 | 0.24 |
| (monoglyceride and Polysorbate 80) | | |
| Flavoring | 0.62 | 0.62 |
| Coloring | 0.005 | 0.005 |
| Water | 62.17 | 62.04 |
| Calcium Sulfate Di Hydrate | 0.0 | 0.13 |
| Strawberry Puree | 4.35 | 4.35 |

The samples were made according to the following procedure:

23.0 pounds of the fat component was melted by heating to a temperature of 160° F. (71° C.) to 170° F. (77° C.) in a 5 gallon jacketed container to form the fat phase. 0.96 pounds of emulsifier was stirred into the fat phase. 34.3 pounds of non-fat dry milk solids was dispersed in 248.7 pounds water and the remaining ingredients (90.7 pounds) were added to form the aqueous phase. The fat and aqueous phaseswere mixed together at 160° F. (71° C.), homogenized at a pressure of 2200 psi, and the emulsion thus formed was pasteurized at 175° F. (79° C.) for 25 seconds. The mix was then cooled to between 30° F. (−1° C.) and 40° F. (4.5° C.) and aged for 16 hours at 40° F. (4° C.). The aged mix was aerated in an ice cream freezer at about 19° F. (−7° C.) to provide an overrun of about 65%, extruded into suitable containers, hardened at a temperature of −20° F. (−29° C.) to −80° F. (−62° C.) and stored in a 0° F. (−18° C.) freezer.

The samples were observed after five days at serving temperatures (approx. 22.5° F. (−5.3° C.)) for accelerated shelf life testing. Sample A and Sample B were compared by subjective evaluation of air cell size and given the following arbitrary numerical values as indicated:

1—no change
2—significant change
3—unacceptable bubble size: too large (approx. 1–2 mm diameter)

| Air size after holding five days at 22.5° F. (−5.3° C.) | |
|---|---|
| Sample A | 3 |
| Sample B | 1 |

The samples remained at serving temperature for the following time periods at which time they reached unacceptable bubble size:

| Sample A | 4 days |
| Sample B | 11 days |

EXAMPLE II

Frozen chocolate flavored aerated deserts having a pH of about 6.6 were prepared containing the following ingredients in parts by weight:

|  | Parts/Weight | |
|---|---|---|
|  | A | B |
| Non-fat Dry Milk Solids | 9.00 | 9.00 |
| Whey Protein Concentrate | 1.0 | 1.0 |
| Fat Component | 6.0 | 6.0 |
| Dextrose | 9.1 | 9.1 |
| Sucrose | 5.8 | 5.8 |
| Corn Syrup | 2.5 | 2.5 |
| Xanthan Gum | 0.18 | 0.18 |
| Carrageenan | 0.06 | 0.06 |
| Emulsifier | 0.25 | 0.25 |
| (monoglyceride and Polysorbate 80) | | |
| Flavoring | 0.56 | 0.56 |
| Water | 64.25 | 64.15 |
| Calcium Sulfate Di Hydrate | 0.0 | 0.10 |
| Cocoa | 1.3 | 1.3 |

The samples were made according to the following procedure:

24.0 pounds of the fat component was melted by heating to a temperature of 160° F. (71° C.) to 170° F. (77° C.) in a 5 gallon jacketed container to form the fat phase. 1.0 pounds of emulsifier was stirred into the fat phase. 36.0 pounds of non-fat dry milk solids was dispersed in 257.0 pounds water and the remaining ingredients (79.5 pounds) were added to form the aqueous phase. The fat and aqueous phaseswere mixed together at 160° F. (71° C.), homogenized at a pressure of 2200 psi, and the emulsion thus formed was pasteurized at 175° F. (79° C.) for 25 seconds. The mix was then cooled to between 30° F. (−1° C.) and 40° F. (4.5° C.) and aged for 16 hours at 40° F. (4.5° C.). The aged mix was aerated in an ice cream freezer at about 19° F. (−7° C.) to provide an overrun of about 65%, extruded into suitable containers, hardened at a temperature of −20°

F. (−29° C.) to −80° F. (−62° C.) and stored in a 0° F. (−18° C.) freezer.

The samples were observed after five days at serving temperatures (approx. 22.5° F. (−5.3° C.)) for accelerated shelf life testing. Sample A and Sample B were compared by subjective evaluation of air cell size and given the arbitrary numerical values as indicated:
1—no change
2—significant change
3—unacceptable bubble size: too large (approx. 1-2 mm diameter)

| | Air size after holding five days at 22.5° F. (−5.3° C.) |
|---|---|
| Sample A | 2.5 |
| Sample B | 2.0 |

The samples remained at serving temperature for the following time periods at which time they reached unacceptable bubble size:

| Sample A | 7 days |
|---|---|
| Sample B | 10 days |

EXAMPLE III

Frozen vanilla flavored aerated desserts having a pH of about 6.5 were prepared containing the following ingredients in parts by weight:

| | Parts/Weight | |
|---|---|---|
| | A | B |
| Non-fat Dry Milk Solids | 9.00 | 9.00 |
| Whey Protein Concentrate | 0.5 | 0.5 |
| Fat Component | 6.0 | 6.0 |
| Dextrose | 10.0 | 10.0 |
| Sucrose | 2.5 | 2.5 |
| Corn Syrup | 6.0 | 6.0 |
| Xanthan Gum | 0.2 | 0.2 |
| Carrageenan | 0.06 | 0.06 |
| Emulsifier (monoglceride and Polysorbate 80) | 0.25 | 0.25 |
| Flavoring | 0.6 | 0.6 |
| Water | 64.89 | 64.79 |
| Calcium Sulfate Di Hydrate | 0.0 | 0.10 |

The sample were made according to the following procedure:

24.0 pounds of the fat component was melted by heating to a temperature of 160° F. (71° C.) to 170° F. (77° C.) in a 5 gallon jacketed container to form the fat phase. 1.0 pounds of emulsifier was stirred into the fat phase. 36.0 pounds of non-fat dry milk solids was dispersed in 259.6 pounds water and the remaining ingredients (79.4 pounds) were added to form the aqueous phase. The fat and aqueous phases were mixed together at 160° F. (71° C.), homogenized at a pressure of 2200 psi, and the emulsion thus formed was pasteurized at 175° F. (79° C.) for 25 seconds. The mix was then cooled to between 30° F. (−1° C.) and 40° F. (4.5° C.) and aged for 16 hours at 40° F. (4.5° C.). The aged mix was aerated in an ice cream freezer at about 19° F. (−7° C.) to provide an overrun of about 65%, extruded into suitable containers, hardened at a temperature of −20° F. (−29° C.) to −80° F. (−62° C.) and stored in a 0° F. (−18° C.) freezer.

The samples were observed after five days at serving temperatures (approx. 22.5° F. (−5.3° C.)) for accelerated shelf life testing. Sample A and Sample B were compared by subjective evaluation of air cell size and given the following arbitrary numerical values as indicated:
1—no change
2—significant change
3—unacceptable bubble size: too large (approx. 1-2 mm diameter)

| | Air size after holding five days at 22.5° F. (−5.3° C.) |
|---|---|
| Sample A | 1.5 |
| Sample B | 1.5 |

The samples remained at serving temperature for the following time periods at which time they reached unacceptable bubble size:

| Sample A | 17 days |
|---|---|
| Sample B | 17 days |

The above shows the effectiveness of adding multivalent cationic materials to enhance stability of frozen aerated dessert products.

What is claimed is:

1. A process of making an oil in water emulsion containing food product comprising the steps of:
   (a) mixing oil, water, protein and an edible multivalent cationic electrolyte to form an oil in water emulsion mix, said electrolyte at least partially dissociating in the mix whereby the mix contains multivalent cations from the electrolyte in an amount in the range of between about 0.5% and about 50% by weight of said protein;
   (b) aging said mix during which the viscosity of the mix is increased by the cations at least 10% as compared to the same mix without the cations.

2. A process as set forth in claim 1 wherein the cations are present in the mix in the range of between about 1% and about 20% by weight of protein.

3. A process as set forth in claim 1 wherein the cations are present in the range of between about 1% and about 5% by weight of protein.

4. A process as set forth in claim 1, 2 or 3 wherein the viscosity of the mix is increased more than about 20%.

5. A process as set forth in claim 1, 2 or 3 wherein the viscosity of the mix is increased more than about 40%.

6. A process as set forth in claim 1 wherein the temperature of the mix is lowered to below 0° C. and the mix is aerated to produce a frozen aerated food product.

7. A process of making a frozen aerated food product comprising the steps of:
   (a) mixing oil, water, edible multivalent cationic electrolyte and protein to form an oil in water emulsion mix said water being present in the range of between about 50% and about 75% by weight of mix, said fat being present in the range of between about 2% and about 30% by weight of mix, said electrolyte providing multivalent cations in the mix in the range of between about 0.5% and about 50% by weight of protein and said protein being present in an amount above about 1% by weight of said mix;
   (b) aging said mix at a temperature of less than about 7° C. with said mix having a viscosity greater than 90 centipoise at 5° C.;

(c) aerating said aged mix to produce an overrun greater than about 50%; and (d) freezing the aerated mix whereby the temperature of the frozen mix upon exit from the freezer is in the range of −10.5° C. to 6° C. with the frozen mix having a viscosity in the range of between about 10,000 centipoise and about 350,000 centipoise as measured at −5.5° C.

8. A food product comprising:

(a) a mixture of oil, water, protein and multivalent cationic electrolyte with at least a portion of the electrolyte being dissociated in the mixture whereby multivalent cations are present in the mixture, said mixture being in the form of an oil in water emulsion, said water being present in the range of between about 50% and about 75% by weight of mix, said fat being present in the range of between about 2% and about 30% by weight of mix said multivalent cations being present in the mixture in the range of between about 0.5% and about 50% by weight of said protein, said mixture having a viscosity above about 400 centipoise as measured at 5° C., and said protein being present in an amount above about 1% by weight of said mix.

9. A food product as set forth in claim 8 wherein the multivalent cations are present in the mix in the range of between about 1% and about 20% by weight of protein.

10. A food product as set forth in claim 8 wherein the multivalent cations are present in the mix in the range of between about 1% and about 5% by weight of protein.

11. A food product as set forth in claim 8, 9 or 10 wherein the viscosity of the mix at 5° C. is in the range of between about 400 centipoise and about 2,000 centipoise.

12. A food product as set forth in claim 8, 9 or 10 wherein the viscosity of the mix at 5° C. is in the range of between about 400 centipoise and about 1,000 centipoise.

13. A food product as set forth in claim 8, 9 or 10 wherein the viscosity of the mix at 5° C. is in the range of between about 500 centipoise and about 800 centipoise.

14. A food product as set forth in claim 8, 9 or 10 wherein the mix is at a temperature in the range of between about −1° C. and about 7° C. and the electrolyte has an effective solubility product in the mix above about $10^{-5}$.

15. An aerated frozen food product comprising:

(a) an oil in water emulsion containing oil, water, protein and edible multivalent cationic electrolyte said water being present in the range of between about 50% and about 75% by weight of mix, said fat being present in the range of between about 2% and about 30% by weight of mix and said protein living present in an amount above about 1% by weight of mix with at least a portion of the electrolyte dissociated in the emulsion whereby multivalent cations are present in the emulsion in the range of between about 0.5% and about 50% by weight of said protein, said emulsion having an overrun above about 50% and having a viscosity at −5.5° C. above about 10,000 centipoise, said emulsion being at a temperature of less than 0° C.

16. An aerated frozen food product as set forth in claim 15 wherein the multivalent cations are present in the emulsion in the range of between about 1% and about 20% by weight of protein.

17. An aerated frozen food product as set forth in claim 15 wherein the multivalent cations are present in the emulsion in the range of between about 1% and about 5% by weight of protein.

18. An aerated frozen food product as set forth in claim 15, 16 or 17 wherein the viscosity of the emulsion at −5.5° C. is in the range of between about 10,000 centipoise and about 350,000 centipoise.

19. An aerated frozen food product as set forth in claim 15, 16 or 17 wherein the viscosity of the emulsion at −5.5° C. is in the range of between about 20,000 centipoise and about 350,000 centipoise.

20. An aerated frozen food product as set forth in claim 15, 16 or 17 wherein the viscosity of the emulsion at −5.5° C. is in the range of between about 30,000 centipoise and about 250,000 centipoise.

21. An aerated frozen food product as set forth in claim 15, 16 or 17 wherein said multivalent cation includes calcium.

22. An aerated frozen food product as set forth in claim 21 wherein said electrolyte includes calcium sulfate dihydrate.

* * * * *